US009704502B2

(12) United States Patent
Malamud et al.

(10) Patent No.: US 9,704,502 B2
(45) **Date of Patent: *Jul. 11, 2017**

(54) CUE-AWARE PRIVACY FILTER FOR PARTICIPANTS IN PERSISTENT COMMUNICATIONS

(75) Inventors: Mark A. Malamud, Seattle, WA (US); Paul G. Allen, Seattle, WA (US); Royce A. Levien, Lexington, MA (US); John D. Rinaldo, Jr., Bellevue, WA (US); Edward K. Y. Jung, Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1583 days.

This patent is subject to a terminal disclaimer.

(21) Appl. No.: 10/909,962

(22) Filed: Jul. 30, 2004

(65) Prior Publication Data

US 2006/0026626 A1 Feb. 2, 2006

(51) Int. Cl.
*H04L 9/00* (2006.01)
*G10L 21/00* (2013.01)
*G10L 21/013* (2013.01)

(52) U.S. Cl.
CPC ...... *G10L 21/00* (2013.01); *G10L 2021/0135* (2013.01)

(58) Field of Classification Search
CPC .... G06F 3/04883; G06F 3/017; G06F 3/0481; G06F 3/0488; G06F 2203/04807; G10L 21/00; G10L 2021/0135
USPC ................................ 715/745, 789, 863, 1.03
See application file for complete search history.

(56) References Cited

U.S. PATENT DOCUMENTS

| | | | | | |
|---|---|---|---|---|---|
| 4,531,228 | A | * | 7/1985 | Noso et al. | 704/275 |
| 4,532,651 | A | | 7/1985 | Pennebaker, Jr. et al. | |
| 4,757,541 | A | * | 7/1988 | Beadles | G10L 15/24 704/254 |
| 4,802,231 | A | * | 1/1989 | Davis | 382/219 |
| 4,829,578 | A | * | 5/1989 | Roberts | G10L 25/87 704/233 |
| 4,952,931 | A | | 8/1990 | Serageldin et al. | |
| 5,126,840 | A | | 6/1992 | Dufresne et al. | |
| 5,278,889 | A | * | 1/1994 | Papanicolaou et al. | 348/14.01 |
| 5,288,938 | A | | 2/1994 | Wheaton | |
| 5,297,198 | A | | 3/1994 | Butani et al. | |
| 5,323,457 | A | * | 6/1994 | Ehara et al. | 379/392.01 |
| 5,386,210 | A | | 1/1995 | Lee | |
| 5,436,653 | A | | 7/1995 | Ellis et al. | |
| 5,511,003 | A | * | 4/1996 | Agarwal | H04N 7/15 348/E7.083 |
| 5,548,188 | A | | 8/1996 | Lee | |

(Continued)

FOREIGN PATENT DOCUMENTS

WO WO 03/058485 A1 7/2003

OTHER PUBLICATIONS

Rugaard, Peer; Sapaty, Peter; "Mobile Control of Mobile Communications"; pp. 1-2; located at: http://www-zorn.ira.uka.de/wave/abstract2.html; printed on Mar. 4, 2005.

(Continued)

*Primary Examiner* — Jung-Mu Chuang

(57) ABSTRACT

A cue, for example a facial expression or hand gesture, is identified, and a device communication is filtered according to the cue.

20 Claims, 5 Drawing Sheets

(56) References Cited

U.S. PATENT DOCUMENTS 5,617,508 A * 4/1997 Reaves .................. G10L 25/78 704/214
5,666,426 A 9/1997 Helms
5,675,708 A 10/1997 Fitzpatrick et al.
5,764,852 A * 6/1998 Williams ..................... 704/243
5,880,731 A * 3/1999 Liles .................. H04L 12/1827 345/473
5,918,222 A * 6/1999 Fukui et al.
5,949,891 A 9/1999 Wagner et al.
5,966,440 A 10/1999 Hair
5,983,369 A * 11/1999 Bakoglu ............ G06F 11/2294 714/25
6,037,986 A 3/2000 Zhang et al.
RE36,707 E * 5/2000 Papanicolaou et al. ... 348/14.04
6,169,541 B1 1/2001 Smith
6,184,937 B1 * 2/2001 Williams .............. H04N 5/272 348/512
6,212,233 B1 4/2001 Alexandre et al.
6,243,683 B1 * 6/2001 Peters .................... G10L 15/24 434/4
6,259,381 B1 7/2001 Small
6,262,734 B1 7/2001 Ishikawa
6,266,430 B1 * 7/2001 Rhoads ............. G06Q 20/1235 382/100
6,269,483 B1 * 7/2001 Broussard .................... 725/143
6,317,716 B1 * 11/2001 Braida et al. ................ 704/275
6,317,776 B1 11/2001 Broussard et al.
6,356,704 B1 * 3/2002 Callway et al. .............. 386/252
6,377,680 B1 * 4/2002 Foladare et al. ......... 379/392.01
6,377,919 B1 * 4/2002 Burnett et al. ................ 704/231
6,396,399 B1 5/2002 Dunlap
6,400,996 B1 * 6/2002 Hoffberg ........... G05B 19/0426 370/218
6,438,223 B1 8/2002 Eskafi et al.
6,473,137 B1 10/2002 Godwin et al.
6,483,532 B1 11/2002 Girod
6,597,405 B1 * 7/2003 Iggulden ...................... 348/553
6,611,281 B2 8/2003 Strubbe
6,617,980 B2 9/2003 Endo et al.
6,622,115 B1 9/2003 Brown et al.
6,690,883 B2 2/2004 Pelletier
6,720,949 B1 4/2004 Pryor et al.
6,724,862 B1 4/2004 Shaffer et al.
6,727,935 B1 * 4/2004 Allen ...................... G01S 17/42 348/14.03
6,749,505 B1 6/2004 Kunzle et al.
6,751,446 B1 * 6/2004 Kim et al. ................... 455/90.1
6,760,017 B1 * 7/2004 Banerjee .......... H04L 29/12009 340/12.54
6,771,316 B1 8/2004 Iggulden
6,775,835 B1 8/2004 Ahmad et al.
6,819,919 B1 11/2004 Tanaka ....................... 455/414.1
6,825,873 B2 * 11/2004 Nakamura et al. ........ 348/14.02
6,829,582 B1 * 12/2004 Barsness ........... H04N 21/4542 704/275
6,845,127 B2 1/2005 Koh
6,882,971 B2 * 4/2005 Craner ......................... 704/246
6,950,796 B2 * 9/2005 Ma et al. ...................... 704/244
6,968,294 B2 11/2005 Gutta et al.
7,043,530 B2 5/2006 Isaacs et al.
7,110,951 B1 * 9/2006 Lemelson et al. ............ 704/270
7,113,618 B2 * 9/2006 Junkins .................. G06F 3/011 348/155
7,120,865 B1 10/2006 Horvitz et al.
7,120,880 B1 * 10/2006 Dryer .................... G06Q 30/02 715/831
7,129,927 B2 10/2006 Mattsson
7,149,686 B1 * 12/2006 Cohen et al. ................ 704/241
7,162,532 B2 * 1/2007 Koehler ................ H04H 20/04 463/40
7,203,635 B2 4/2007 Oliver et al.
7,203,911 B2 4/2007 Williams
7,209,757 B2 4/2007 Naghian et al.
7,233,684 B2 * 6/2007 Fedorovskaya et al. ..... 382/118
7,319,955 B2 1/2008 Deligne et al.
RE40,054 E 2/2008 Girod
7,336,804 B2 * 2/2008 Steffin .......................... 382/104
7,379,568 B2 * 5/2008 Movellan et al. ............ 382/118
7,409,639 B2 * 8/2008 Dempski et al. ............. 715/705
7,418,116 B2 * 8/2008 Fedorovskaya et al. ..... 382/118
7,424,098 B2 * 9/2008 Kovales et al. ................ 379/76
7,472,063 B2 * 12/2008 Nefian ................ G06K 9/6293 382/227
7,496,272 B2 2/2009 DaSilva
7,587,069 B2 * 9/2009 Movellan et al. ............ 382/118
7,624,076 B2 * 11/2009 Movellan et al. .............. 706/12
7,634,533 B2 12/2009 Rudolph et al.
7,647,560 B2 * 1/2010 Macauley ............... A63F 13/12 709/206
7,660,806 B2 * 2/2010 Brill et al. ............. 707/999.101
7,664,637 B2 * 2/2010 Deligne et al. ............... 704/233
7,680,302 B2 * 3/2010 Steffin .......................... 382/103
7,684,982 B2 * 3/2010 Taneda .......................... 704/233
7,689,413 B2 * 3/2010 Hershey et al. .............. 704/226
7,768,543 B2 * 8/2010 Christiansen ............. 348/14.08
7,860,718 B2 * 12/2010 Lee et al. ...................... 704/276
7,953,112 B2 * 5/2011 Hindus et al. ................ 370/468
7,995,090 B2 * 8/2011 Liu et al. ................... 348/14.01
8,009,966 B2 * 8/2011 Bloom et al. ................. 386/285
8,132,110 B1 * 3/2012 Appelman ............ G06F 3/0482 715/710
8,416,806 B2 * 4/2013 Hindus et al. ................ 370/468
8,571,853 B2 10/2013 Peleg et al.
8,578,439 B1 11/2013 Mathias et al.
8,599,266 B2 * 12/2013 Trivedi et al. ................ 348/169
8,676,581 B2 * 3/2014 Flaks et al. ................... 704/240
8,769,297 B2 * 7/2014 Rhoads ............ G06F 17/30017 380/51
8,977,250 B2 3/2015 Malamud et al.
9,563,278 B2 * 2/2017 Xiang ..................... G06F 3/167
2001/0033666 A1 * 10/2001 Benz ............................ 381/119
2002/0025026 A1 2/2002 Gerszberg et al. .......... 379/67.1
2002/0025048 A1 * 2/2002 Gustafsson ........... G10L 19/012 381/61
2002/0028674 A1 3/2002 Slettengren et al.
2002/0097842 A1 * 7/2002 Guedalia et al. ............ 379/67.1
2002/0113757 A1 * 8/2002 Hoisko .............. H04N 1/32128 345/8
2002/0116196 A1 * 8/2002 Tran ............................. 704/270
2002/0116197 A1 * 8/2002 Erten ................... G06K 9/6292 704/273
2002/0119802 A1 * 8/2002 Hijii ............................. 455/550
2002/0138587 A1 * 9/2002 Koehler ................. H04H 20/04 709/207
2002/0155844 A1 10/2002 Rankin et al.
2002/0161882 A1 * 10/2002 Chatani ................... A63F 13/12 709/224
2002/0164013 A1 * 11/2002 Carter et al. ............. 379/387.02
2002/0176585 A1 11/2002 Egelmeers et al. ........ 381/71.11
2002/0180864 A1 * 12/2002 Nakamura et al. ........ 348/14.02
2002/0184505 A1 12/2002 Mihcak et al.
2002/0191804 A1 * 12/2002 Luo et al. ..................... 381/312
2003/0005462 A1 * 1/2003 Broadus ................. H04N 7/147 725/110
2003/0007648 A1 * 1/2003 Currell ............................ 381/61
2003/0009248 A1 1/2003 Wiser et al.
2003/0035553 A1 * 2/2003 Baumgarte ............... H04S 3/00 381/94.2
2003/0048880 A1 3/2003 Horvath et al. ........... 379/88.01
2003/0076293 A1 4/2003 Mattsson
2003/0088397 A1 * 5/2003 Karas et al. ...................... 704/1
2003/0093790 A1 * 5/2003 Logan et al. ................... 725/38
2003/0117987 A1 6/2003 Brebner
2003/0187657 A1 * 10/2003 Erhart ................. H04M 3/4936 704/270.1
2003/0202780 A1 10/2003 Dumm et al.
2003/0210800 A1 11/2003 Yamada et al.
2004/0006767 A1 * 1/2004 Robson ................ H04N 7/0887 725/28
2004/0008423 A1 1/2004 Driscoll, Jr. et al.
2004/0012613 A1 1/2004 Rast ............................. 345/632
2004/0044777 A1 3/2004 Alkhatib et al.

(56) References Cited

U.S. PATENT DOCUMENTS

2004/0049780 A1* 3/2004 Gee ................................ 725/32
2004/0056857 A1* 3/2004 Zhang et al. ................. 345/419
2004/0101212 A1* 5/2004 Fedorovskaya et al. ..... 382/305
2004/0109023 A1 6/2004 Tsuchiya
2004/0125877 A1* 7/2004 Chang et al. ............ 375/240.28
2004/0127241 A1 7/2004 Shostak
2004/0143636 A1 7/2004 Horvitz et al.
2004/0148346 A1 7/2004 Weaver et al.
2004/0193910 A1 9/2004 Moles
2004/0204135 A1* 10/2004 Zhao ................. H04M 1/72536 455/566
2004/0205775 A1 10/2004 Heikes et al.
2004/0215731 A1 10/2004 Tzann-en Szeto
2004/0215732 A1 10/2004 McKee et al.
2004/0220812 A1* 11/2004 Bellomo ................. G10L 21/06 704/275
2004/0230659 A1 11/2004 Chase
2004/0236836 A1 11/2004 Appelman et al.
2004/0243682 A1 12/2004 Markki et al.
2004/0252813 A1* 12/2004 Rhemtulla .......... H04M 7/1295 379/67.1
2004/0261099 A1* 12/2004 Durden et al. .................. 725/32
2004/0263914 A1 12/2004 Yule et al.
2005/0010637 A1* 1/2005 Dempski ........... G06F 17/30056 709/204
2005/0018925 A1 1/2005 Bhagavatula et al. ........ 382/278
2005/0028221 A1* 2/2005 Liu et al. ...................... 725/133
2005/0037742 A1* 2/2005 Patton ............... H04M 1/72563 455/414.1
2005/0042591 A1* 2/2005 Bloom et al. ............. 434/307 A
2005/0053356 A1 3/2005 Mate et al.
2005/0064826 A1* 3/2005 Bennetts ................ H04B 1/123 455/114.3
2005/0073575 A1 4/2005 Thacher et al.
2005/0083248 A1* 4/2005 Biocca et al. .................... 345/8
2005/0125500 A1 6/2005 Wu
2005/0131744 A1* 6/2005 Brown ................... G06Q 10/10 705/7.29
2005/0262201 A1* 11/2005 Rudolph ............. H04L 12/1827 709/205
2006/0004911 A1 1/2006 Becker et al.
2006/0015560 A1* 1/2006 MacAuley .............. A63F 13/12 709/206
2006/0025220 A1* 2/2006 Macauley ............... A63F 13/12 463/42
2006/0056639 A1* 3/2006 Ballas ..................... H04S 1/005 381/17
2006/0187305 A1 8/2006 Trivedi et al.
2006/0224382 A1* 10/2006 Taneda .................... G10L 15/25 704/233
2007/0038455 A1* 2/2007 Murzina et al. .............. 704/263
2007/0201731 A1* 8/2007 Fedorovskaya et al. ..... 382/118
2007/0203911 A1 8/2007 Chiu
2007/0211141 A1* 9/2007 Christiansen .............. 348/14.08
2007/0280290 A1* 12/2007 Hindus et al. ................ 370/468
2007/0288978 A1 12/2007 Pizzurro et al.
2008/0037840 A1 2/2008 Steinberg et al.
2008/0059530 A1 3/2008 Cohen et al.
2008/0192983 A1* 8/2008 Steffin ........................... 382/104
2008/0235165 A1* 9/2008 Movellan et al. .............. 706/12
2008/0247598 A1* 10/2008 Movellan et al. ............ 382/100
2009/0147971 A1* 6/2009 Kuhr et al. ................... 381/109
2009/0167839 A1 7/2009 Ottmar
2010/0124363 A1 5/2010 Ek et al.
2011/0228039 A1* 9/2011 Hindus et al. ............. 348/14.03
2012/0135787 A1* 5/2012 Kusunoki et al. ......... 455/575.8

OTHER PUBLICATIONS

PCT International Search Report; International App. No. PCT/US05/26428; Feb. 2, 2006.

PCT International Search Report; International App. No. PCT/US05/26429; Feb. 1, 2007.

PCT International Search Report; International App. No. PCT/US05/29768; Apr. 18, 2006.

* cited by examiner

CUE-AWARE PRIVACY FILTER FOR PARTICIPANTS IN PERSISTENT COMMUNICATIONS

TECHNICAL FIELD

The present disclosure relates to inter-device communication.

BACKGROUND

Modern communication devices are growing increasingly complex. Devices such as cell phones and laptop computers now often are equipped with cameras, microphones, and other sensors. Depending on the context of a communication (e.g. where the person using the device is located and to whom they are communicating, the date and time of day, among possible factors), it may not always be advantageous to communicate information collected by the device in its entirety, and/or unaltered.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A device communication is filtered according to an identified cue. The cue can include at least one of a facial expression, a hand gesture, or some other body movement. The cue can also include at least one of opening or closing a device, deforming a flexible surface of the device, altering an orientation of the device with respect to one or more objects of the environment, or sweeping a sensor of the device across the position of at least one object of the environment. Filtering may also take place according to identified aspects of a remote environment.

Filtering the device communication can include, when the device communication includes images/video, at least one of including a visual or audio effect in the device communication, such as blurring, de-saturating, color modification of, or snowing of one or more images communicated from the device. When the device communication includes audio, filtering the device communication comprises at least one of altering the tone of, altering the pitch of, altering the volume of, adding echo to, or adding reverb to audio information communicated from the device.

Filtering the device communication may include substituting image information of the device communication with predefined image information, such as substituting a background of a present location with a background of a different location. Filtering can also include substituting audio information of the device communication with predefined audio information, such as substituting at least one of a human voice or functional sound detected by the device with a different human voice or functional sound.

Filtering may also include removing information from the device communication, such as suppressing background sound information of the device communication, suppressing background image information of the device communication, removing a person's voice information from the device communication, removing an object from the background information of the device communication, and removing the image background from the device communication.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
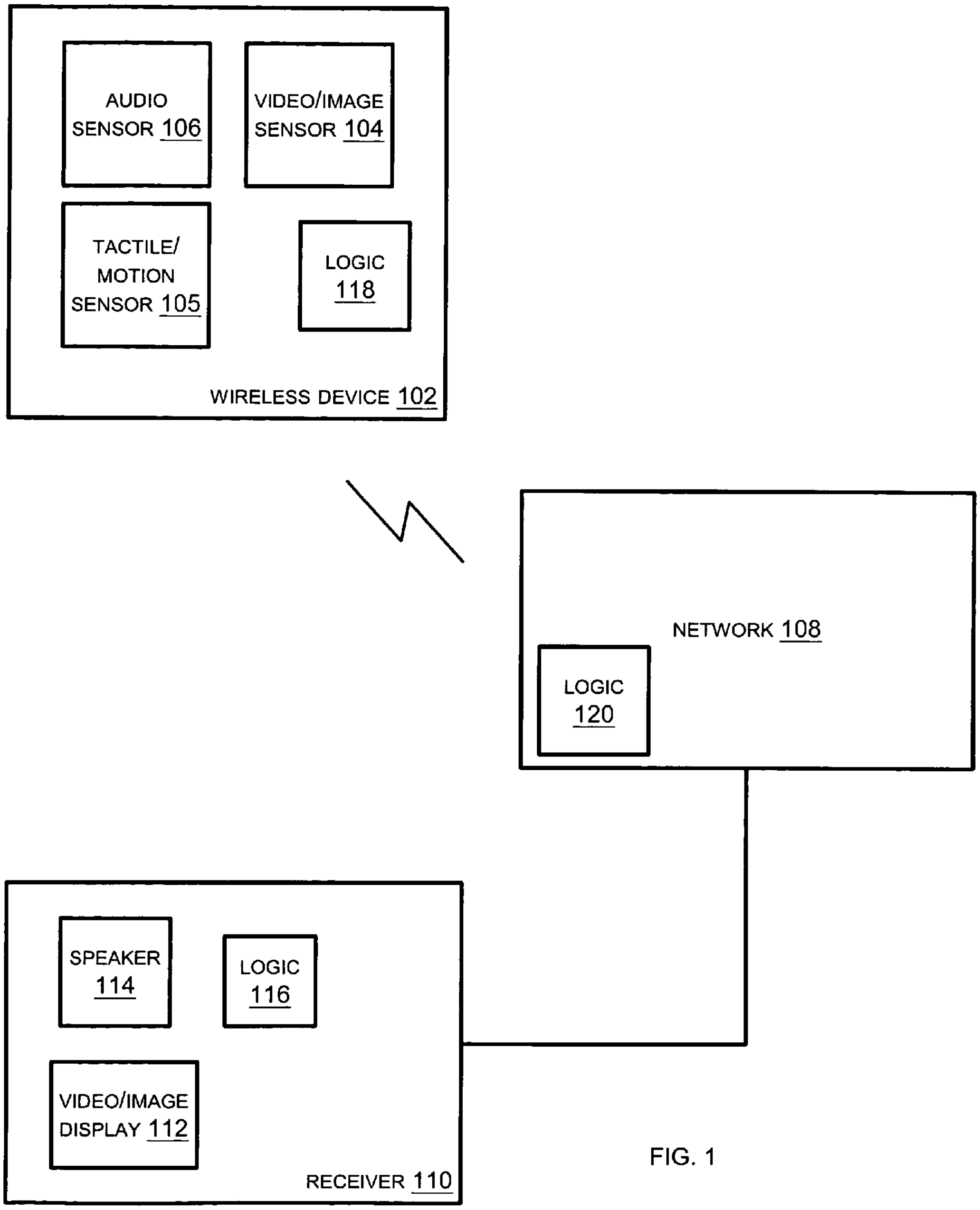
FIG. 1 is a block diagram of an embodiment of a device communication arrangement.

FIG. 1 is a block diagram of an embodiment of a device communication arrangement. A wireless device 102 comprises logic 118, a video/image sensor 104, an audio sensor 106, and a tactile/motion sensor 105. A video/image sensor (such as 104) comprises a transducer that converts light signals (e.g. a form of electromagnetic radiation) to electrical, optical, or other signals suitable for manipulation by logic. Once converted, these signals may be known as images or a video stream. An audio sensor (such as 106) comprises a transducer that converts sound waves (e.g. audio signals in their original form) to electrical, optical, or other signals suitable for manipulation by logic. Once converted, these signals may be known as an audio stream. A tactile/motion sensor (such as 105) comprises a transducer that converts contact events with the sensor, and/or motion of the sensor, to electrical, optical, or other signals suitable for manipulation by logic. Logic (such as 116, 118, and 120) comprises information represented in device memory that may be applied to affect the operation of a device. Software and firmware are examples of logic. Logic may also be embodied in circuits, and/or combinations of software and circuits.

The wireless device 102 communicates with a network 108, which comprises logic 120. As used herein, a network (such as 108) is comprised of a collection of devices that facilitate communication between other devices. The devices that communicate via a network may be referred to as network clients. A receiver 110 comprises a video/image display 112, a speaker 114, and logic 116. A speaker (such as 114) comprises a transducer that converts signals from a device (typically optical and/or electrical signals) to sound waves. A video/image display (such as 112) comprises a device to display information in the form of light signals. Examples are monitors, flat panels, liquid crystal devices, light emitting diodes, and televisions. The receiver 110 communicates with the network 108. Using the network 108, the wireless device 102 and the receiver 110 may communicate.

The device 102 or the network 108 identify a cue, either by using their logic or by receiving a cue identification from the device 102 user. Device 102 communication is filtered, either by the device 102 or the network 108, according to the cue. Cues can comprise conditions that occur in the local environment of the device 102, such as body movements, for example a facial expression or a hand gesture. Many more conditions or occurrences in the local environment can potentially be cues. Examples include opening or closing the device (e.g. opening or closing a phone), the deforming of a flexible surface of the device 102, altering of the device 102 orientation with respect to one or more objects of the environment, or sweeping a sensor of the device 102 across at least one object of the environment. The device 102, or user, or network 108 may identify a cue in the remote environment. The device 102 and/or network 108 may filter the device communication according to the cue and the remote environment. The local environment comprises those people, things, sounds, and other phenomenon that affect the sensors of the device 102. In the context of this figure, the remote environment comprises those people, things, sounds, and other signals, conditions or items that affect the sensors of or are otherwise important in the context of the receiver 110.

The device 102 or network 108 may monitor an audio stream, which forms at least part of the communication of the device 102, for at least one pattern (the cue). A pattern is a particular configuration of information to which other information, in this case the audio stream, may be compared. When the at least one pattern is detected in the audio stream, the device 102 communication is filtered in a manner associated with the pattern. Detecting a pattern can include detecting a specific sound. Detecting the pattern can include detecting at least one characteristic of an audio stream, for example, detecting whether the audio stream is subject to copyright protection.

The device 102 or network 108 may monitor a video stream, which forms at least part of a communication of the device 102, for at least one pattern (the cue). When the at least one pattern is detected in the video stream, the device 102 communication is filtered in a manner associated with the pattern. Detecting the pattern can include detecting a specific image. Detecting the pattern can include detecting at least one characteristic of the video stream, for example, detecting whether the video stream is subject to copyright protection.

Figure 2:
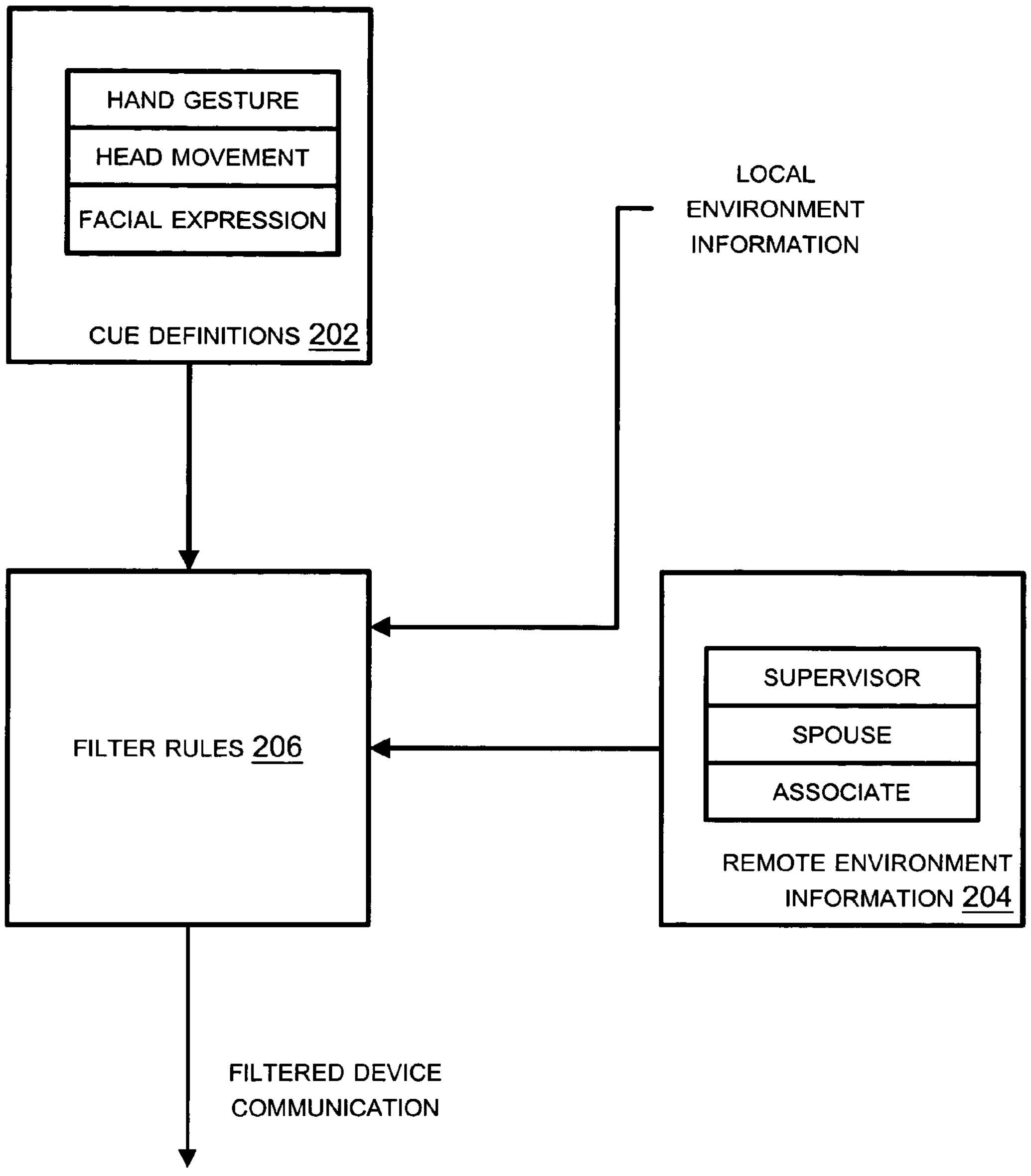
FIG. 2 is a block diagram of an embodiment of an arrangement to produce filtered device communications.

FIG. 2 is a block diagram of an embodiment of an arrangement to produce filtered device communications. Cue definitions 202 comprise hand gestures, head movements, and facial expressions. In the context of this figure, the remote environment information 204 comprise a supervisor, spouse, and associates. The filter rules 206 define operations to apply to the device communications and the conditions under which those operations are to be applied. The filter rules 206 in conjunction with at least one of the cue definitions 202 are applied to the local environment information to produce filtered device communications. Optionally, a remote environment definition 204 may be applied to the filter rules 206, to determine at least in part the filter rules 206 applied to the local environment information.

Filtering can include modifying the device communication to incorporate a visual or audio effect. Examples of visual effects include blurring, de-saturating, color modification of, or snowing of one or more images communicated from the device. Examples of audio effects include altering the tone of, altering the pitch of, altering the volume of, adding echo to, or adding reverb to audio information communicated from the device.

Filtering can include removing (e.g. suppressing) or substituting (e.g. replacing) information from the device communication. Examples of information that may suppressed as a result of filtering include the background sounds, the background image, a background video, a person's voice, and the image and/or sounds associated with an object within the image or video background. Examples of information that may be replaced as a result of filtering include background sound information which is replaced with potentially different sound information and background video information which is replaced with potentially different video information. Multiple filtering operations may occur; for example, background audio and video may both be suppressed by filtering. Filtering can also result in application of one or more effects and removal of part of the communication information and substitution of part of the communication information.

Figure 3:
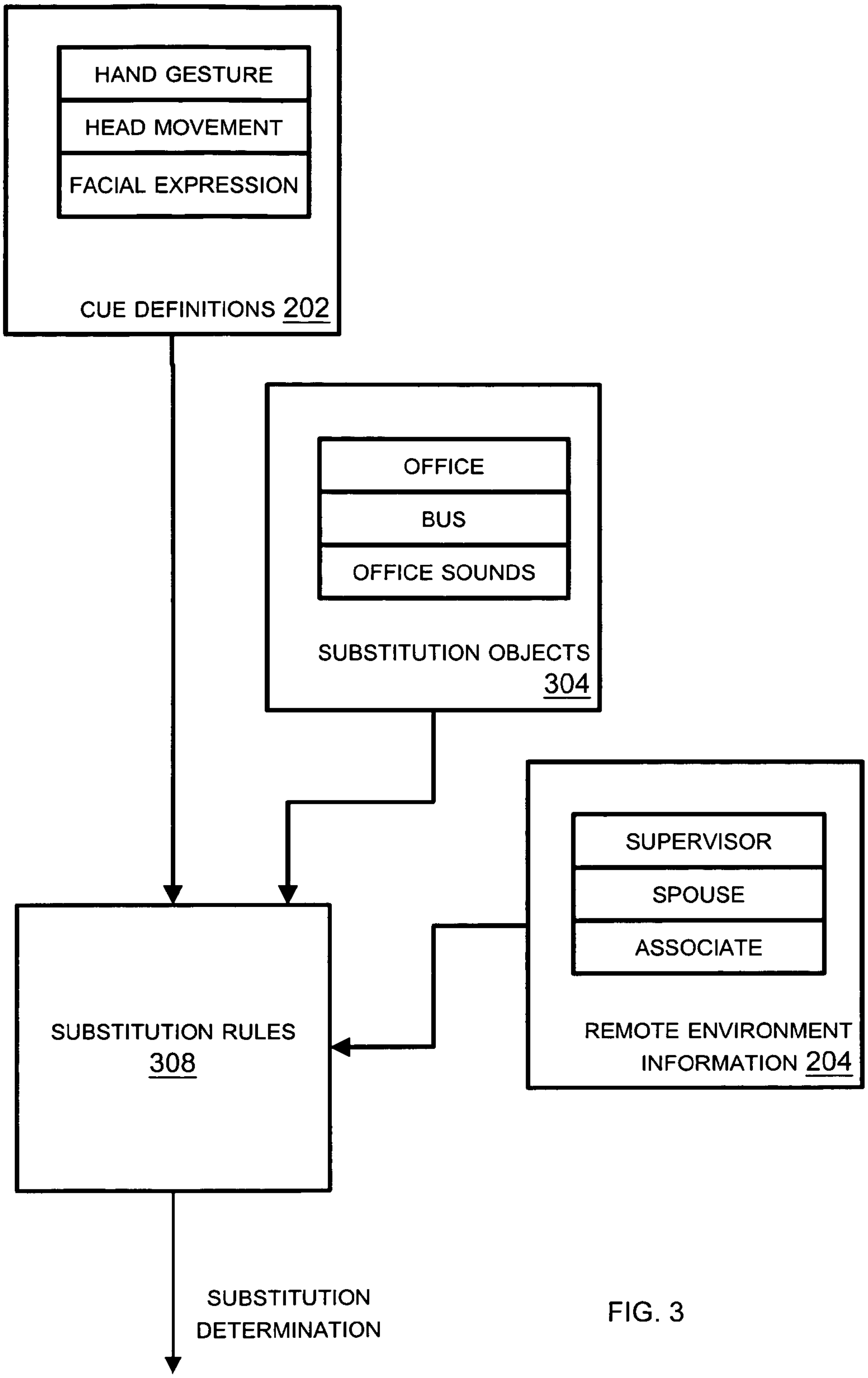
FIG. 3 is a block diagram of another embodiment of a device communication arrangement.

FIG. 3 is a block diagram of another embodiment of a device communication arrangement. The substitution objects 304 comprise office, bus, and office sounds. The substitution objects 304 are applied to the substitution rules 308 along with the cue definitions 202 and, optionally, the remote environment information 204. Accordingly, the substitution rules 308 produce a substitution determination for the device communication. The substitution determination may result in filtering.

Filtering can include substituting image information of the device communication with predefined image information. An example of image information substitution is the substituting a background of a present location with a background of a different location, e.g. substituting the office background for the local environment background when the local environment is a bar.

Filtering can include substituting audio information of the device communication with predefined audio information. An example of audio information substitution is the substituting at least one of a human voice or functional sound detected by the device with a different human voice or functional sound, e.g. the substitution of bar background noise (the local environment background noise) with tasteful classical music.

Figure 4:
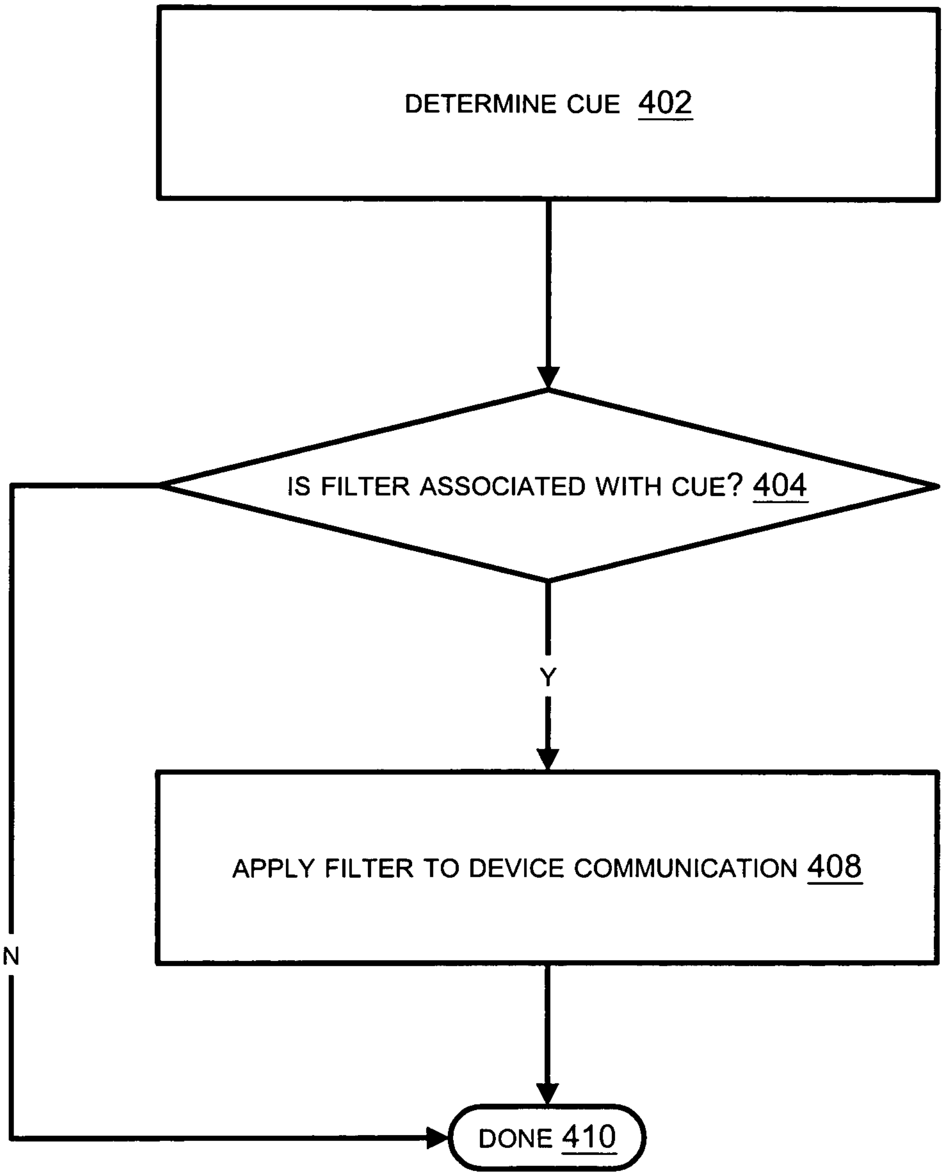
FIG. 4 is a flow chart of an embodiment of a method of filtering device communications according to a cue.

FIG. 4 is a flow chart of an embodiment of a method of filtering device communications according to a cue. At 402 it is determined that there is a cue. If at 404 it is determined that no filter is associated with the cue, the process concludes. If at 404 it is determined that a filter is associated with the cue, the filter is applied to device communication at 408. At 410 the process concludes.

Figure 5:
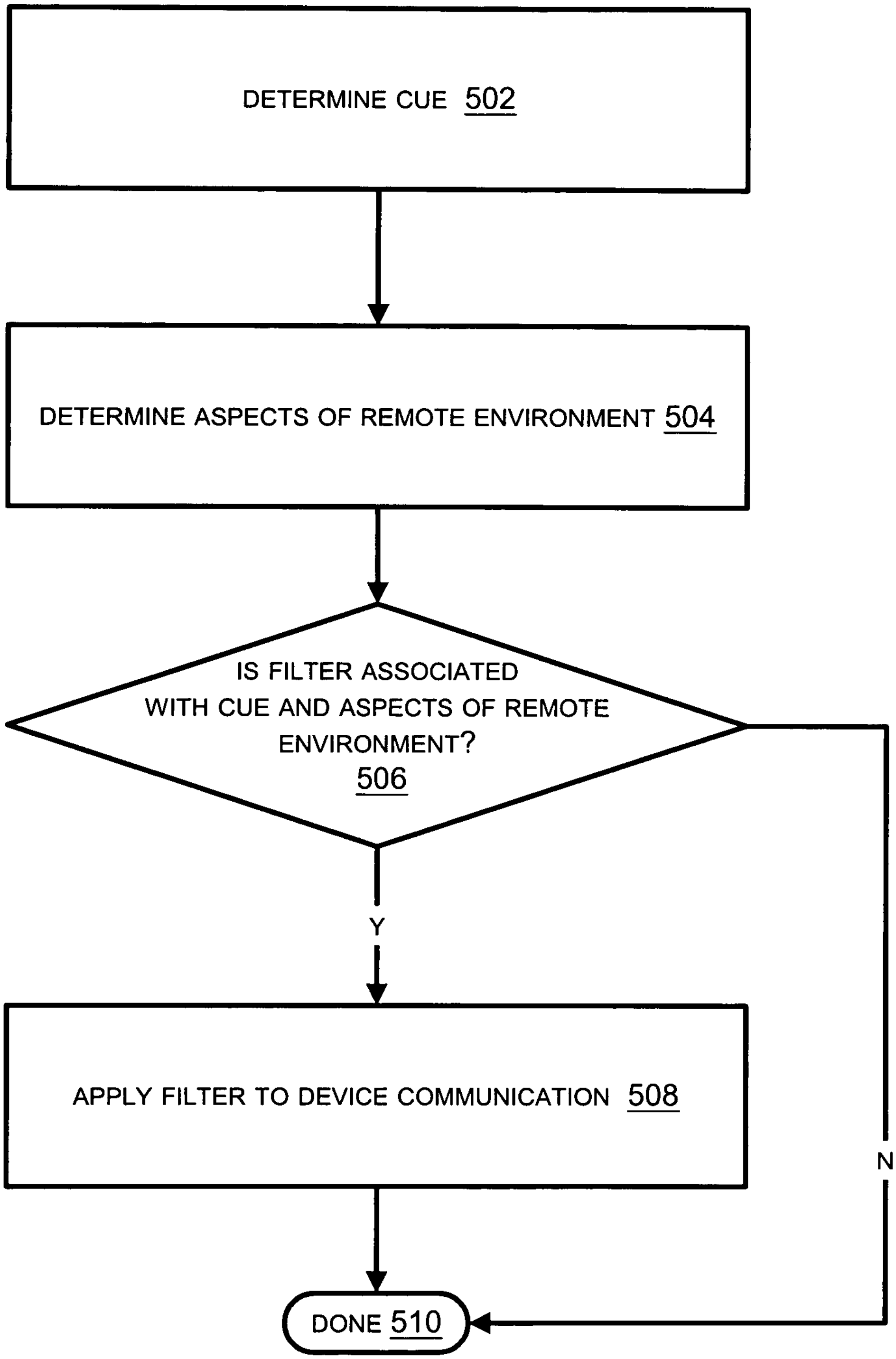
FIG. 5 is a flow chart of an embodiment of a method of filtering device communications according to a cue and a remote environment.

FIG. 5 is a flow chart of an embodiment of a method of filtering device communications according to a cue and a remote environment. At 502 it is determined that there is a cue. At 504 at least one aspect of the remote environment is determined. If at 506 it is determined that no filter is associated with the cue and with at least one remote environment aspect, the process concludes. If at 506 it is determined that a filter is associated with the cue and with at least one remote environment aspect, the filter is applied to device communication at 508. At 510 the process concludes.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A system comprising:

at least one communication device including at least:

circuitry configured for engaging at least one synchronous communication between the at least one communication device and at least one receiving device in a remote environment;

one or more sensors including one or more of at least one audio sensor configured for sensing at least one of an audio signal stream or at least one video sensor configured for sensing at least one visual signal stream in a local environment for transmission to the at least one receiving device in the remote environment;

circuitry configured for obtaining remote environment information including at least one identifier of at least one participant in the at least one synchronous communication in the remote environment;

circuitry configured for detecting at least one manipulation of the at least one communication device by at least one user of the at least one communication device, wherein the at least one manipulation includes at least one of opening of the at least one communication device, closing of the at least one communication device, deforming a flexible surface of the at least one communication device, or altering an orientation of the at least one communication device;

circuitry configured for determining one or more filter rules based at least partly on the detected at least one manipulation of the at least one communication device by the at least one user of the at least one communication device and the at least one identifier of at least one participant in the at least one synchronous communication in the remote environment;

circuitry configured for filtering at least part of the at least one of an audio signal stream or a visual signal stream according to the one or more filter rules; and circuitry configured for transmitting the filtered at least one of the audio signal stream or the visual signal stream to the at least one receiving device.

2. The system of claim 1, wherein the circuitry configured for filtering at least part of the at least one of an audio signal stream or a visual signal stream according to the one or more filter rules comprises:

circuitry configured for replacing at least some content of the at least one of an audio signal stream or a visual signal stream according to the one or more filter rules.

3. The system of claim 1, wherein the circuitry configured for filtering at least part of the at least one of an audio signal stream or a visual signal stream according to the one or more filter rules comprises:

circuitry configured for removing at least one voice of the at least one audio signal stream according to the one or more filter rules.

4. The system of claim 1, wherein the circuitry configured for filtering at least part of the at least one of an audio signal stream or a visual signal stream according to the one or more filter rules comprises:

circuitry configured for removing at least some video content of the at least one visual signal stream according to the one or more filter rules.

5. The system of claim 1, wherein the circuitry configured for filtering at least part of the at least one of an audio signal stream or a visual signal stream according to the one or more filter rules comprises:

circuitry configured for replacing at least some video content of the at least one visual signal stream according to the one or more filter rules.

6. The system of claim 1, wherein the circuitry configured for filtering at least part of the at least one of an audio signal stream or a visual signal stream according to the one or more filter rules comprises:

circuitry configured for substituting at least one voice of the at least one communication with at least one different voice in the at least one audio signal stream according to the one or more filter rules.

7. The system of claim 1, wherein the circuitry configured for filtering at least part of the at least one of an audio signal stream or a visual signal stream according to the one or more filter rules comprises:

circuitry configured for removing at least one background sound of the at least one audio signal stream according to the one or more filter rules.

8. The system of claim 1, wherein the circuitry configured for filtering at least part of the at least one of an audio signal stream or a visual signal stream according to the one or more filter rules comprises:

circuitry configured for replacing at least one background sound of the at least one communication with at least one different background sound according to the one or more filter rules.

9. The system of claim 1, wherein the circuitry configured for filtering at least part of the at least one of an audio signal stream or a visual signal stream according to the one or more filter rules comprises:

circuitry configured for replacing at least one background sound of the at least one communication with at least one audio effect according to the one or more filter rules.

10. The system of claim 1, wherein the circuitry configured for filtering at least part of the at least one of an audio signal stream or a visual signal stream according to the one or more filter rules comprises:

circuitry configured for replacing at least one background noise of the at least one communication with at least some music according to the one or more filter rules.

11. The system of claim 1, wherein the circuitry configured for filtering at least part of the at least one of an audio signal stream or a visual signal stream according to the one or more filter rules comprises:

circuitry configured for altering at least one of tone, pitch, or volume of the at least one communication according to the one or more filter rules.

12. The system of claim 1, wherein the circuitry configured for filtering at least part of the at least one of an audio signal stream or a visual signal stream according to the one or more filter rules comprises:

circuitry configured for filtering at least part of the at least one communication including adding one or more audio effects according to the one or more filter rules.

13. The system of claim 1, wherein the circuitry configured for filtering at least part of the at least one of an audio signal stream or a visual signal stream according to the one or more filter rules comprises:

circuitry configured for suppressing at least part of the at least one communication according to the one or more filter rules.

14. The system of claim 1, wherein the circuitry configured for filtering at least part of the at least one of an audio signal stream or a visual signal stream according to the one or more filter rules comprises:

circuitry configured for filtering at least part of the at least one phone communication according to the one or more filter rules.

15. The system of claim 1, wherein the circuitry configured for filtering at least part of the at least one of an audio signal stream or a visual signal stream according to the one or more filter rules comprises:

circuitry configured for filtering at least part of the at least one audiovisual communication according to the one or more filter rules.

16. The system of claim 1, wherein the circuitry configured for obtaining remote environment information including at least one identifier of at least one participant in the at least one synchronous communication in the remote environment includes at least one of:

circuitry configured for receiving a cue identification from the at least one communication device;

circuitry configured for identifying participants in the at least one communication present in the remote environment;

circuitry configured for detecting one or more signals in a context of the at least one receiving device;

circuitry configured for detecting one or more sounds in the remote environment;

circuitry configured for detecting at least one specific sound in the remote environment;

circuitry configured for detecting at least one pattern of an audio stream from the remote environment;

circuitry configured for detecting at least one specific image in the remote environment;

circuitry configured for detecting at least one pattern of a video stream from the remote environment;

circuitry configured for detecting one or more conditions in the context of the at least one receiving device; or at least one video sensor configured to detect at least one of hand gestures, head movements, facial expressions, body movements, or sweeping a sensor of the device across at least one object of an environment.

17. The system of claim 1, wherein the at least one communication device includes:

at least one of a cell phone, a wireless device, or a computer.

18. The system of claim 1, wherein the circuitry configured for detecting at least one manipulation of the at least one communication device by at least one user of the at least one communication device comprises:

at least one of:

circuitry configured for detecting at least one manipulation of the at least one communication device by at least one user of the at least one communication device including at least one body movement of the at least one user of the at least one communication device;

circuitry configured for detecting at least one manipulation of the at least one communication device by at least one user of the at least one communication device including at least one hand gesture of the at least one user of the at least one communication device;

circuitry configured for detecting at least one manipulation of the at least one communication device by at least one user of the at least one communication device including at least one facial expression of the at least one user of the at least one communication device; or circuitry configured for detecting at least one manipulation of the at least one communication device by at least one user of the at least one communication device including at least one head movement of the at least one user of the at least one communication device.

19. The system of claim 1 wherein the at least one receiving device includes at least one of a cell phone, a wireless device, a computer, a video/image display, or a speaker.

20. A method at least partly performed using one or more processing components in at least one communication device, the method comprising:

engaging at least one synchronous communication between at least one communication device and at least one receiving device in a remote environment;

sensing at least one of an audio signal stream via at least one communication device audio sensor or a visual signal stream via at least one communication device video sensor in a local environment for transmission to the at least one receiving device in the remote environment;

obtaining remote environment information including at least one identifier of at least one participant in the at least one synchronous communication in the remote environment;

detecting at least one manipulation of the at least one communication device by at least one user of the at least one communication device, wherein the at least one manipulation includes at least one of opening of the at least one communication device, closing of the at least one communication device, deforming a flexible surface of the at least one communication device, or altering an orientation of the at least one communication device;

determining one or more filter rules based at least partly on the detected at least one manipulation of the at least one communication device by the at least one user of the at least one communication device and the at least one identifier of at least one participant in the at least one synchronous communication in the remote environment;

filtering at least part of the at least one of an audio signal stream or a visual signal stream according to the one or more filter rules; and transmitting the filtered at least one of an audio signal stream or a visual signal stream to the at least one receiving device.

* * * * *